United States Patent
Suzuki et al.

(10) Patent No.: US 9,729,838 B2
(45) Date of Patent: Aug. 8, 2017

(54) DISCHARGE LAMP DRIVER, LIGHT SOURCE, PROJECTOR, AND METHOD OF DRIVING DISCHARGE LAMP

(71) Applicant: SEIKO EPSON CORPORATION, Tokyo (JP)

(72) Inventors: Junichi Suzuki, Chino (JP); Shun Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 538 days.

(21) Appl. No.: 14/282,685

(22) Filed: May 20, 2014

(65) Prior Publication Data

US 2014/0354961 A1    Dec. 4, 2014

(30) Foreign Application Priority Data

May 29, 2013  (JP) .................................. 2013-112628

(51) Int. Cl.

| H05B 41/34 | (2006.01) |
| H04N 9/31 | (2006.01) |
| H05B 41/288 | (2006.01) |
| G03B 21/20 | (2006.01) |

(52) U.S. Cl.
CPC ....... H04N 9/3155 (2013.01); H05B 41/2886 (2013.01); G03B 21/2026 (2013.01)

(58) Field of Classification Search
CPC .. H05B 41/34; H05B 41/2886; H04N 9/3155; H04N 9/31

USPC ............................................. 353/85; 315/246
See application file for complete search history.

(56) References Cited

U.S. PATENT DOCUMENTS

| 2010/0084987 A1 | 4/2010 | Yamauchi et al. |
| 2011/0025989 A1* | 2/2011 | Ono ................ H05B 41/2928 353/85 |
| 2012/0313546 A1 | 12/2012 | Imamura et al. |

FOREIGN PATENT DOCUMENTS

| JP | 2009-252352 A | 10/2009 |
| JP | A-2010-114064 | 5/2010 |
| JP | A-2011-210565 | 10/2011 |
| JP | A-2012-243681 | 12/2012 |

* cited by examiner

Primary Examiner — Steven H Whitesell Gordon
Assistant Examiner — Jerry Brooks
(74) Attorney, Agent, or Firm — Oliff PLC

(57) ABSTRACT

A discharge lamp driver includes a discharge lamp drive unit that supplies a drive current to the discharge lamp, and a control unit that controls the discharge lamp drive unit according to a drive current waveform, wherein the drive current waveform has a mixed frequency drive period including a unit drive period containing a first drive period in which a first drive current is supplied to the discharge lamp and a second drive period provided immediately after the first drive period, in which a second drive current is supplied to the discharge lamp, the first drive current is a half-period alternating current having a frequency higher than 10 Hz and not higher than 300 Hz, the second drive current is an alternating current having a frequency higher than 1000 Hz, and a length of the second drive period is equal to or longer than a length of the first drive period.

19 Claims, 8 Drawing Sheets

DISCHARGE LAMP DRIVER, LIGHT SOURCE, PROJECTOR, AND METHOD OF DRIVING DISCHARGE LAMP

BACKGROUND

1. Technical Field

The present invention relates to a discharge lamp driver, a light source, a projector, and a method of driving a discharge lamp.

2. Related Art

Discharge lamps including high-pressure mercury lamps used for projectors or the like emit light by arc discharge within gases in plasma state. The arc discharge produces various reactions within the discharge lamp and causes illuminance reduction of the discharge lamp. There is a task of suppressing the illuminance reduction of the discharge lamp and extending the life of the discharge lamp.

Generally, as causes of the illuminance reduction of the discharge lamp, three main causes of blackening that electrode materials evaporated by arc discharge attach to the inner wall of the arc tube of the discharge lamp, devitrification that the inner wall of the arc tube is crystallized to be opaque due to its higher temperature and transmittance is lower, and electrode wear due to arc discharge are known.

As a method of suppressing the electrode wear, a method of controlling a distance between electrodes by controlling an amount of power supplied to the discharge lamp and suppressing excessive melt of the electrodes has been disclosed (for example, Patent Document 1 (JP-A-2010-114064)).

Further, as a method of suppressing blackening and devitrification, a method of effectively suppressing blackening and devitrification by steadily using a drive current having a larger frequency than 1000 Hz has been disclosed because it is known that an alternating current having a high frequency is effectively used as the drive current (for example, Patent Document 2 (JP-A-2012-243681)).

However, for example, in the method disclosed in Patent Document 1, the evaporated electrode material may attach to the inner wall of the arc tube and blacken. In this case, the electrode material attaching to the inner wall of the arc tube raise the temperature of the inner wall of the arc tube and devitrification is likely to occur.

Further, for example, in the method disclosed in Patent Document 2, the high frequency is used as the drive current, the temperature variations of the electrodes decrease and the electrodes are likely to be worn in a short period.

Accordingly, for example, in application to a projector, in order to improve use efficiency of light, it is preferable to maintain the smaller distance between electrodes and reduce the magnitude of light emission, however, for suppression of electrode wear, suppression of blackening and devitrification is difficult and, for suppression of blackening and devitrification, suppression of electrode wear is difficult. Therefore, it has been difficult to achieve a good balance between the suppression of blackening and devitrification and the suppression of electrode wear and extend the life of the discharge lamp.

SUMMARY

An advantage of some aspects of the invention is to provide a discharge lamp driver that suppresses both blackening and devitrification and electrode wear of a discharge lamp and improves the life of the discharge lamp, and a light source using the discharge lamp driver, a projector using the light source. Another advantage of some aspects of the invention is to provide a method of driving the discharge lamp that suppresses both blackening and devitrification and electrode wear of the discharge lamp and improves the life of the discharge lamp.

A discharge lamp driver according to an aspect of the invention includes a discharge lamp drive unit that supplies a drive current for driving a discharge lamp to the discharge lamp, and a control unit that controls the discharge lamp drive unit according to a drive current waveform, wherein the drive current waveform has a mixed frequency drive period including a unit drive period containing a first drive period in which a first drive current is supplied to the discharge lamp and a second drive period provided immediately after the first drive period, in which a second drive current is supplied to the discharge lamp, the first drive current is a half-period alternating current having a frequency higher than 10 Hz and not higher than 300 Hz, the second drive current is an alternating current having a frequency higher than 1000 Hz, and a length of the second drive period is equal to or longer than a length of the first drive period.

According to the configuration, in the first drive period in which the first drive current as the half-period alternating current having the frequency higher than 10 Hz and equal to or lower than 300 Hz is supplied, the electrode temperature rises and the electrode material melts. Further, in the second drive period in which the second drive current as the alternating current having the frequency higher than 1000 Hz is supplied, the electrode temperature falls and the melted electrode material aggregates and coagulates. By alternately repeating the periods, the electrode grows and electrode wear is suppressed. Further, the second drive period is provided to be equal to or longer than the first drive period, and the high frequency higher than 1000 Hz is used, and thereby, blackening may be effectively suppressed. Therefore, the discharge lamp driver that may suppress both electrode wear and blackening and devitrification and improve the life of the discharge lamp is obtained.

The unit drive period may contain a first unit drive period in which the first drive current has one polarity and a second unit drive period in which the first drive current has the other polarity, the mixed frequency drive period may contain a first mixed frequency drive period including the first unit drive period and a second mixed frequency drive period including the second unit drive period, and the first mixed frequency drive period and the second mixed frequency drive period may be alternately provided.

According to the configuration, the periods in which the first drive current having different polarity flows are alternately provided, and thereby, growth of both electrodes may be nearly equal and increase of the distance between electrodes due to deviation of electrode wear may be suppressed.

A high-frequency drive period in which a high-frequency alternating current having a frequency higher than 1000 Hz is supplied to the discharge lamp drive unit may be provided between the first and the second mixed frequency drive periods.

According to the configuration, the high-frequency drive period in which the high-frequency alternating current flows in the discharge lamp is provided, and blackening of the discharge lamp may be suppressed more effectively.

The high-frequency drive period may contain a first high-frequency drive period provided after the first mixed frequency drive period, and a second high-frequency drive period provided after the second mixed frequency drive period, and a total period length of the first high-frequency drive period and the second high-frequency drive period may be equal to or longer than 50% of a length of a period from a start of the first mixed frequency drive period to a start of next first mixed frequency drive period.

According to the configuration, electrode wear may be effectively suppressed and blackening and devitrification of the discharge lamp may be suppressed.

The high-frequency drive period may be provided immediately after the mixed frequency drive period.

According to the configuration, the high-frequency drive period is provided immediately after the electrode temperature is higher in the mixed frequency drive period, and thereby, the excessive growth of the electrodes may be suppressed and blackening and devitrification of the discharge lamp may be effectively suppressed.

The mixed frequency drive period may include one to fifty of the unit drive periods.

According to the configuration, electrode wear may be effectively suppressed and blackening and devitrification of the discharge lamp may be suppressed.

A low-frequency drive period in which a low-frequency alternating current having a frequency higher than 10 Hz and equal to or lower than 1000 Hz is supplied may be provided after the mixed frequency drive period.

According to the configuration, the low-frequency drive period is provided, and thereby, the shapes of the grown electrodes may be arranged in the mixed frequency drive periods and the life of the discharge lamp may be improved.

The frequency of the low-frequency alternating current may be higher than 100 Hz and equal to or lower than 600 Hz.

According to the configuration, the shapes of the electrodes may be effectively arranged and the life of the discharge lamp may be improved.

A light source according to another aspect of the invention includes a discharge lamp that outputs light, and the discharge lamp driver according to the aspect of the invention.

According to the configuration, the light source with the discharge lamp having improved life and advantageous reliability is obtained.

A projector according to still another aspect of the invention includes the light source according to the aspect of the invention, a light modulator that modulates the light output from the light source in response to a video signal, and a projection system that projects the light modulated by the light modulator on a projected surface.

According to the configuration, the projector with the discharge lamp having improved life and advantageous reliability is obtained.

A method of driving a discharge lamp according to yet another aspect of the invention includes supplying a half-period alternating current having a frequency higher than 10 Hz and equal to or lower than 300 Hz to the discharge lamp in a first drive period, and supplying an alternating current having a frequency higher than 1000 Hz to the discharge lamp in a second drive period provided immediately after the first drive period, wherein a length of the second drive period is equal to or longer than a length of the first drive period.

According to the method, in the first drive period in which the first drive current as the half-period alternating current having the frequency higher than 10 Hz and equal to or lower than 300 Hz is supplied, the electrode temperature rises and the electrode material melts. Further, in the second drive period in which the second drive current as the alternating current having the frequency higher than 1000 Hz is supplied, the electrode temperature falls and the melted electrode material aggregates and coagulates. By alternately repeating the periods, the electrodes grow and electrode wear is suppressed. Further, the second drive period is provided to be equal to or longer than the first drive period, and the high frequency higher than 1000 Hz is used, and thereby, blackening may be effectively suppressed. Therefore, both electrode wear and blackening and devitrification may be suppressed and the life of the discharge lamp may be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a projector according to an embodiment of the invention will be explained with reference to the drawings.

Note that the scope of the invention is not limited to the following embodiments, but may be arbitrarily changed within the scope of the technical idea of the invention. Further, in the following drawings, scales, numerals, etc. in the actual structures and respective structures are different for clarification of the respective configurations.

Figure 1:
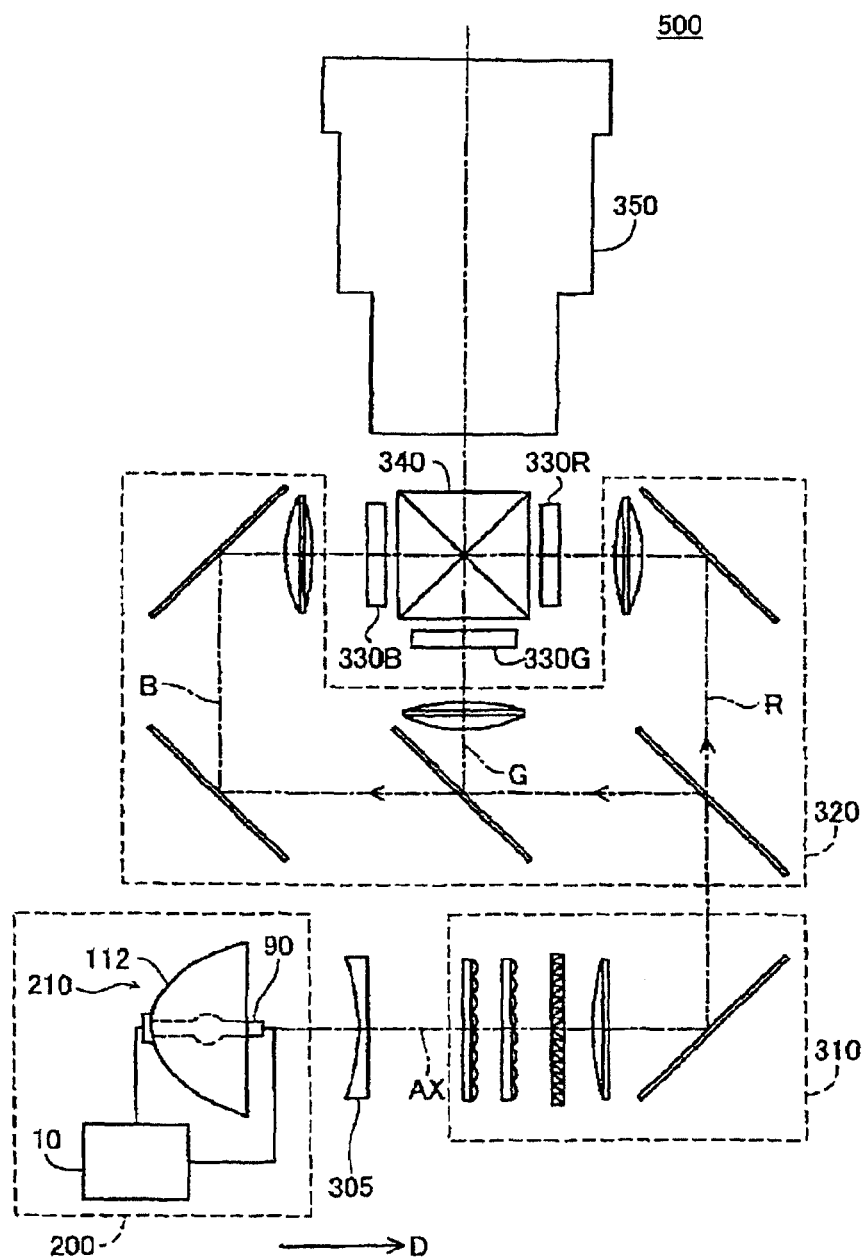
FIG. 1 is a schematic configuration diagram of a projector of an embodiment.

As shown in FIG. 1, the projector 500 of the embodiment includes a light source 200, a parallelizing lens 305, an illumination system 310, a color separation system 320, three liquid crystal light valves 330R, 330G, 330B (light modulators), a cross dichroic prism 340, and a projection system 350.

The light output from the light source 200 passes through the parallelizing lens 305 and enters the illumination system 310. The parallelizing lens 305 has a function of parallelizing light from the light source 200.

The illumination system 310 has a function of adjustment to homogenize illuminance of the lights output from the light source 200 on the liquid crystal light valves 330R, 330G, 330B. The illumination system 310 also has a function of aligning polarization directions of the lights output from the light source 200 in one direction. This is for effectively using the lights output from the light source 200 in the liquid crystal light valves 330R, 330G, 330B.

The lights with adjusted illumination distributions and polarization directions enter the color separation system 320. The color separation system 320 separates the incident lights into three color lights of red light (R), green light (G), and blue light (B). The three color lights are respectively modulated by the liquid crystal light valves 330R, 330G, 330B corresponding to the respective colors. The liquid crystal light valves 330R, 330G, 330B include liquid crystal panels 560R, 560G, 560B and polarizers (not shown), which will be described later.

The polarizers are provided at the light-incident sides and the light-exiting sides of the respective liquid crystal panels 560R, 560G, 560B.

The modulated three color lights are combined by the cross dichroic prism 340. The combined light enters the projection system 350. The projection system 350 projects the incident light on a screen 700 (see FIG. 3). Thereby, an image is displayed on the screen 700. Note that, as the respective configurations of the parallelizing lens 305, the illumination system 310, the color separation system 320, the cross dichroic prism 340, and the projection system 350, various known configurations may be employed.

Figure 2:
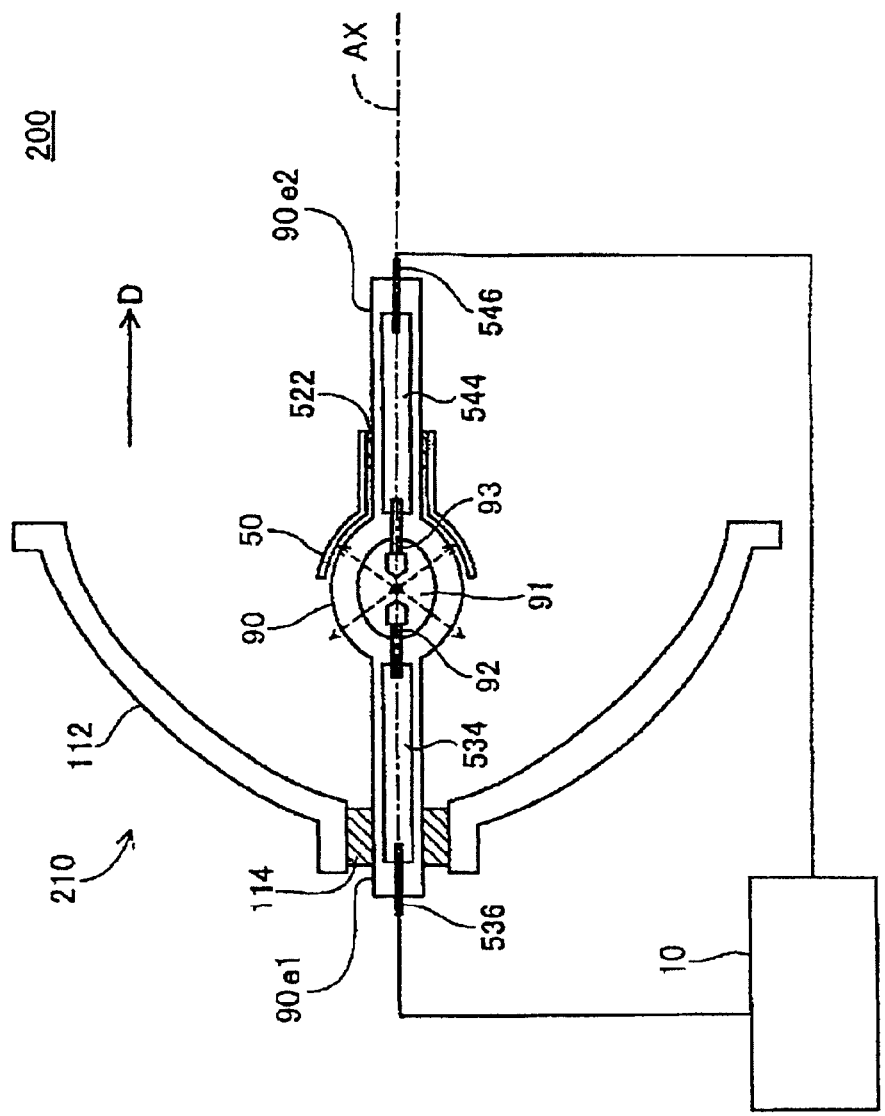
FIG. 2 is a sectional view of a discharge lamp in the embodiment.

FIG. 2 is a sectional view showing a configuration of the light source 200. The light source 200 includes a light source unit 210 and a discharge lamp lighter (discharge lamp driver) 10. FIG. 2 shows a sectional view of the light source unit 210. The light source unit 210 includes a main reflector 112, a discharge lamp 90, and a sub-reflector 50.

The discharge lamp lighter 10 supplies a drive current (drive power) to the discharge lamp 90 to light the discharge lamp 90. The main reflector 112 reflects the light emitted from the discharge lamp 90 toward an irradiation direction D. The irradiation direction D is in parallel to an optical axis AX of the discharge lamp 90.

The shape of the discharge lamp 90 is a rod-like shape extending along the irradiation direction D. One end of the discharge lamp 90 is referred to as "first end 90e1" and the other end of the discharge lamp 90 is referred to as "second end 90e2". The material of the discharge lamp 90 is a light-transmissive material including quartz glass, for example. The center part of the discharge lamp 90 bulges in a spherical shape, and the inside thereof is a discharge space 91. A gas as a discharge medium including rare gas and metal halide is enclosed in the discharge space 91.

In the discharge space 91, ends of a first electrode 92 and a second electrode 93 project. The first electrode 92 is provided at the first end 90e1 side of the discharge space 91. The second electrode 93 is provided at the second end 90e2 side of the discharge space 91. The shapes of the first electrode 92 and the second electrode 93 are rod shapes extending along the optical axis AX. In the discharge space 91, the electrode ends of the first electrode 92 and the second electrode 93 are provided to be opposed apart at a predetermined distance. The material of the first electrode 92 and the second electrode 93 is a metal including tungsten, for example.

A first terminal 536 is provided on the first end 90e1 of the discharge lamp 90. The first terminal 536 and the first electrode 92 are electrically connected by a conducting member 534 penetrating inside of the discharge lamp 90. Similarly, a second terminal 546 is provided on the second end 90e2 of the discharge lamp 90. The second terminal 546 and the second electrode 93 are electrically connected by a conducting member 544 penetrating inside of the discharge lamp 90. The material of the first terminal 536 and the second terminal 546 is a metal including tungsten, for example. As the material of the conducting members 534, 544, for example, a molybdenum foil is used.

The first terminal 536 and the second terminal 546 are connected to the discharge lamp lighter 10. The discharge lamp lighter 10 supplies a drive current for driving the discharge lamp 90 to the first terminal 536 and the second terminal 546. As a result, arc discharge occurs between the first electrode 92 and the second electrode 93. The lights generated by the arc discharge (discharge light) radiate from the discharge position in all directions as shown by dashed arrows.

The main reflector 112 is fixed to the first end 90e1 of the discharge lamp 90 by a fixing member 114. The main reflector 112 reflects the light, among the discharge lights, traveling toward the opposite side to the irradiation direction D in the irradiation direction D. The shape of the reflection surface (the surface at the discharge lamp 90 side) of the main reflector 112 is not particularly limited within such a range that the discharge lights may be reflected in the irradiation direction D, but may be a spheroidal shape or paraboloidal shape, for example. For example, in the case where the shape of the reflection surface of the main reflector 112 is the paraboloidal shape, the main reflector 112 may convert the discharge light into light nearly in parallel to the optical axis AX. Thereby, the parallelizing lens 305 is dispensable.

The sub-reflector 50 is fixed to the second end 90e2 side of the discharge lamp 90 by a fixing member 522. The shape of the reflection surface (the surface at the discharge lamp side) of the sub-reflector 50 is a spherical shape surrounding the part of the discharge space 91 at the second end 90e2 side. The sub-reflector 50 reflects the light, among the discharge lights, traveling toward the opposite side to the side at which the main reflector 112 is provided toward the main reflector 112. Thereby, the use efficiency of the lights radiated from the discharge space 91 may be improved.

The material of the fixing members 114, 522 is not particularly limited in a range as a heat-resistant material that can resist heat generated from the discharge lamp 90, but may be an inorganic adhesive, for example. As the method of fixing the arrangement of the main reflector 112, the sub-reflector 50, and the discharge lamp 90, not limited to the method of fixing the main reflector 112 and the sub-reflector 50 to the discharge lamp 90, but any method may be employed. For example, the discharge lamp 90 and the main reflector 112 may be independently fixed to a casing (not shown) of the projector. The same applies to the sub-reflector 50.

As below, a circuit configuration of the projector 500 will be explained.

Figure 3:
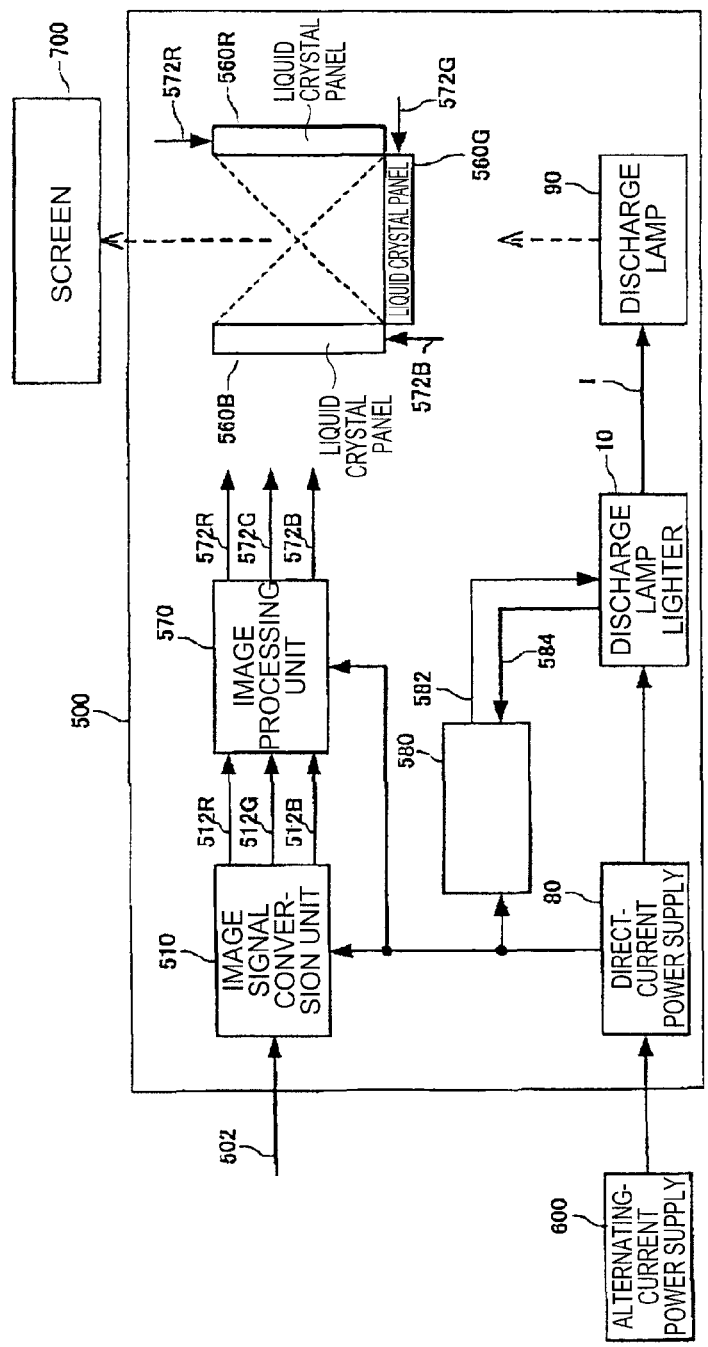
FIG. 3 is a block diagram showing various component elements of the projector of the embodiment.

FIG. 3 shows an example of the circuit configuration of the projector 500 of the embodiment. The projector 500 includes an image signal conversion unit 510, a direct-current power supply 80, the liquid crystal panels 560R, 560G, 560B, an image processing unit 570, and a CPU (Central Processing Unit) 580 in addition to the optical systems shown in FIG. 1.

The image signal conversion unit 510 converts an image signal 502 (a brightness-color-difference signal, an analog RGB signal, or the like) input from outside into a digital RGB signal having a predetermined word length to generate image signals 512R, 512G, 512B and supplies the signals to the image processing unit 570.

The image processing unit 570 respectively performs image processing on the three image signals 512R, 512G, 512B. The image processing unit 570 supplies drive signals 572R, 572G, 572B for respectively driving the liquid crystal panels 560R, 560G, 560B to the liquid crystal panels 560R, 560G, 560B.

The direct-current power supply 80 converts an alternating-current voltage supplied from an external alternating-current power supply 600 into a constant direct-current voltage. The direct-current power supply 80 supplies the direct-current voltage to the image signal conversion unit 510, the image processing unit 570 at the secondary side of a transformer (not shown, but contained in the direct-current power supply 80) and the discharge lamp lighter 10 at the primary side of the transformer.

The discharge lamp lighter 10 generates a high voltage between the electrodes of the discharge lamp 90 when activated and causes breakdown to form a discharge path. Afterward, the discharge lamp lighter 10 supplies a drive current I for the discharge lamp 90 to maintain discharge.

The liquid crystal panels 560R, 560G, 560B are provided in the above described liquid crystal light valves 330R, 330G, 330B, respectively. The liquid crystal panels 560R, 560G, 560B modulate transmittance (brightness) of the color lights entering the respective liquid crystal panels 560R, 560G, 560E via the above described optical systems based on the drive signals 572R, 572G, 572B, respectively.

The CPU 580 controls various operations from start of lighting to extinction of the projector 500. For example, in the example of FIG. 3, a lighting command and an extinction command are output via a communication signal 582 to the discharge lamp lighter 10. The CPU 580 receives lighting information of the discharge lamp 90 via a communication signal 584 from the discharge lamp lighter 10.

As below, a configuration of the discharge lamp lighter 10 will be explained.

Figure 4:
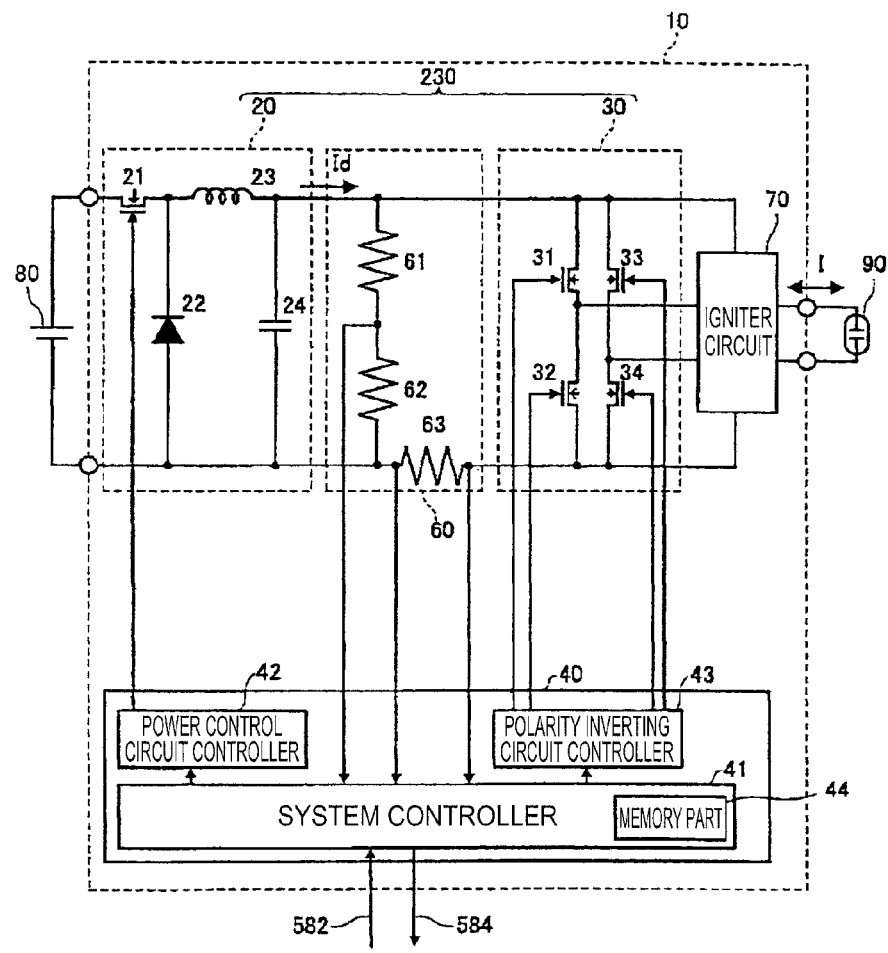
FIG. 4 is a circuit diagram of a discharge lamp lighter of the embodiment.

FIG. 4 shows an example of a circuit configuration of the discharge lamp lighter 10.

As shown in FIG. 4, the discharge lamp lighter 10 includes a power control circuit 20, a polarity inverting circuit 30, a control unit 40, an operation detection unit 60, and an igniter circuit 70.

The power control circuit 20 generates drive power supplied to the discharge lamp 90. In the embodiment, the power control circuit 20 includes a down chopper circuit with input of the voltage from the direct-current power supply 80 drops the input voltage and outputs a direct current Id.

The power control circuit 20 includes a switch element 21, a diode 22, a coil 23, and a capacitor 24. The switch element 21 includes a transistor, for example. In the embodiment, one end of the switch element 21 is connected to the positive voltage side of the direct-current power supply 80 and the other end is connected to the cathode terminal of the diode 22 and one end of the coil 23.

One end of the capacitor 24 is connected to the other end of the coil 23 and the other end of the capacitor 24 is connected to the anode terminal of the diode 22 and the negative voltage side of the direct-current power supply 80. A current control signal is input to the control terminal of the switch element 21 from the control unit 40 to be described later, and ON/OFF of the switch element 21 is controlled. For the current control signal, for example, a PWM (Pulse Width Modulation) control signal may be used.

When the switch element 21 is turned ON, a current flows in the coil 23 and energy is accumulated in the coil 23. Then, when the switch element 21 is turned OFF, the energy accumulated in the coil 23 is released in a path passing through the capacitor 24 and the diode 22. As a result, the direct current Id in response to the rate of time when the switch element 21 is ON is generated.

The polarity inverting circuit 30 inverts the polarity of the direct current Id input from the power control circuit 20 at predetermined timing. Thereby, the polarity inverting circuit 30 generates the drive current I as a direct current that continues in a controlled time or the drive current I as an alternating current having an arbitrary frequency, and outputs the current. In the embodiment, the polarity inverting circuit 30 includes an inverter bridge circuit (full-bridge circuit).

The polarity inverting circuit 30 includes a first switch element 31, a second switch element 32, a third switch element 33, and a fourth switch element 34 including transistors, for example. The polarity inverting circuit 30 has a configuration in which the series-connected first switch element 31 and second switch element 32 and the series-connected third switch element 33 and fourth switch element 34 are parallel-connected to each other. Polarity inversion control signals are respectively input from the control unit 40 to the control terminals of the first switch element 31, the second switch element 32, the third switch element 33, and the fourth switch element 34. ON/OFF operations of the first switch element 31, the second switch element 32, the third switch element 33, and the fourth switch element 34 are controlled based on the polarity inversion control signals.

In the polarity inverting circuit 30, the operation of alternately turning ON/OFF of the first switch element 31 and the fourth switch element 34, the second switch element 32 and the third switch element 33 is repeated. Thereby, the polarity of the direct current Id output from the power control circuit 20 is alternately inverted. From a common connection point between the first switch element 31 and the second switch element 32 and a common connection point between the third switch element 33 and the fourth switch element 34, the drive current I as a direct current that continues the same polarity state in a controlled time or the drive current I as an alternating current having a controlled frequency is generated and output.

That is, in the polarity inverting circuit 30, control is performed so that, when the first switch element 31 and the fourth switch element 34 are ON, the second switch element 32 and the third switch element 33 may be OFF and, when the first switch element 31 and the fourth switch element 34 are OFF, the second switch element 32 and the third switch element 33 may be ON. Therefore, when the first switch element 31 and the fourth switch element 34 are ON, the drive current I flowing from one end of the capacitor 24 in the order of the first switch element 31, the discharge lamp 90, and the fourth switch element 34 is generated. When the second switch element 32 and the third switch element 33 are ON, the drive current I flowing from one end of the capacitor 24 in the order of the third switch element 33, the discharge lamp 90, and the second switch element 32 is generated.

In the embodiment, the part combining the power control circuit 20 and the polarity inverting circuit 30 corresponds a discharge lamp drive unit 230. That is, the discharge lamp drive unit 230 supplies the drive current I for driving the discharge lamp 90 to the discharge lamp 90.

The control unit 40 controls the discharge lamp drive unit 230. In the example of FIG. 4, the control unit 40 controls the power control circuit 20 and the polarity inverting circuit 30, and thereby, controls the retention time in which the drive current I continues the same polarity, the current value and the frequency of the drive current I, etc. The control unit 40 performs polarity inversion control of controlling the retention time in which the drive current I continues the same polarity, the frequency of the drive current I, etc. on the polarity inverting circuit 30 according to the polarity inversion timing of the drive current I. Further, the control unit 40 performs current control of controlling the current value of the output direct current Id on the power control circuit 20.

The configuration of the control unit 40 is not particularly limited. In the embodiment, the control unit 40 includes a system controller 41, a power control circuit controller 42, and a polarity inverting circuit controller 43. Note that a part or whole of the control unit 40 may be formed by a semiconductor integrated circuit.

The system controller 41 controls the power control circuit controller 42 and the polarity inverting circuit controller 43, and thereby, controls the power control circuit and the polarity inverting circuit 30. The system controller 41 may control the power control circuit controller 42 and the polarity inverting circuit controller 43 based on a drive voltage Vla and the drive current I detected by the operation detection unit 60.

In the embodiment, the system controller 41 includes a memory part 44. The memory part 44 may be provided independent of the system controller 41.

The system controller 41 may control the power control circuit 20 and the polarity inverting circuit 30 based on information stored in the memory part 44. In the memory part 44, for example, information on drive parameters of the retention time in which the drive current I continues the same polarity, the current value, the frequency, the waveform, and the modulation pattern of the drive current I, etc. may be stored.

The power control circuit controller 42 outputs a current control signal to the power control circuit 20 based on a control signal from the system controller 41, and thereby, controls the power control circuit 20.

The polarity inverting circuit controller 43 outputs the polarity inversion control signal to the polarity inverting circuit 30 based on the control signal from the system controller 41, and thereby, controls the polarity inverting circuit 30.

The control unit 40 may be realized using a dedicated circuit to perform the above described control and various kinds of control of the processing to be described later. On the other hand, the control unit 40 may function as a computer by the CPU executing a control program stored in the memory part 44, for example, to perform various kinds of control of the processing.

Figure 5:
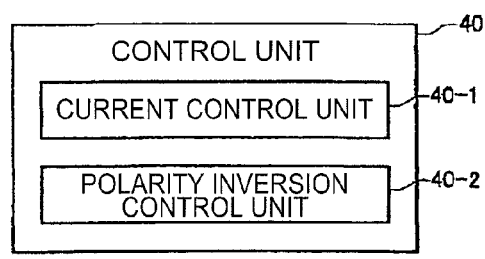
FIG. 5 is a block diagram showing one configuration example of a control unit of the embodiment.

FIG. 5 is a diagram for explanation of another configuration example of the control unit 40. As shown in FIG. 5, the control unit 40 may be adapted to function as a current control unit 40-1 configured to control the power control circuit 20 and a polarity inversion control unit 40-2 configured to control the polarity inverting circuit 30 by the control program.

In the example shown in FIG. 4, the control unit 40 is formed as a part of the discharge lamp lighter 10. On the other hand, the CPU 580 may be adapted to serve a part of the function of the control unit 40.

For example, the operation detection unit 60 may include a voltage detection part that detects the drive voltage Vla of the discharge lamp 90 and outputs drive voltage information to the control unit 40, a current detection part that detects the drive current I and outputs drive current information to the control unit 40, etc. In the embodiment, the operation detection unit 60 includes a first resistor 61, a second resistor 62, and a third resistor 63.

In the embodiment, the voltage detection part detects the drive voltage Vla using the voltage divided by the first resistor 61 and the second resistor 62 series-connected to each other and in parallel to the discharge lamp 90. Further, in the embodiment, the current detection part detects the drive current I using the voltage generated in the third resistor 63 series-connected to the discharge lamp 90.

The igniter circuit 70 operates only when the lighting of the discharge lamp 90 is started. The igniter circuit 70 supplies a high voltage (a voltage higher than that when the discharge lamp 90 is normally lighted) necessary for breakdown between the electrodes (between the first electrode 92 and the second electrode 93) of the discharge lamp 90 at the start of lighting of the discharge lamp 90 to form a discharge path to between the electrodes (between the first electrode 92 and the second electrode 93) of the discharge lamp 90. In the embodiment, the igniter circuit 70 is parallel-connected to the discharge lamp 90.

As below, a relationship between the polarity of the drive current I and the electrode temperature will be explained.

FIG. 6A, 6B and FIGS. 7A, 7B, 7C are explanatory diagrams showing the relationship between the polarity of the drive current I to be supplied to the discharge lamp 90 and the electrode temperature.

Figure 6A:
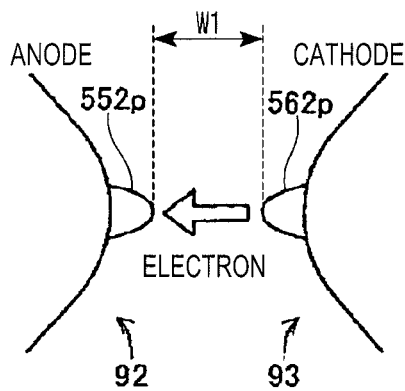
FIGS. 6A and 6B show projections on ends of electrodes of the discharge lamp.
Figure 6B:
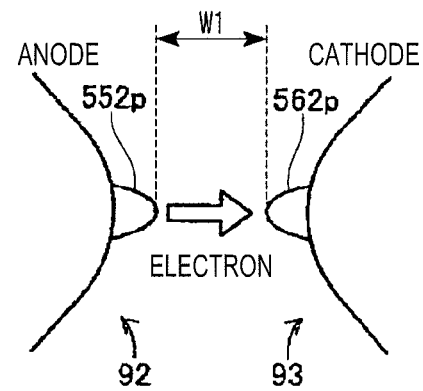

FIGS. 6A and 6B show operation states of the first electrode 92 and the second electrode 93.

FIGS. 6A and 6B show ends of the first electrode 92 and the second electrode 93. Projections 552p, 562p are formed on the ends of the first electrode 92 and the second electrode 93, respectively. Discharge generated between the first electrode 92 and the second electrode 93 is mainly generated between the projection 552p and the projection 562p. In the case where there are the projections 552p, 562p as in the embodiment, compared to the case without projections, shifts of the discharge position (arc position) in the first electrode 92 and the second electrode 93 may be suppressed. However, the projections 552p, 562p are not necessarily formed.

FIG. 6A shows a first polarity state in which the first electrode 92 operates as an anode and the second electrode operates as a cathode. In the first polarity state, electrons move from the second electrode 93 (cathode) to the first electrode 92 (anode) by discharge. The electrons are emitted from the cathode (second electrode 93). The electrons emitted from the cathode (second electrode 93) collide with the end of the anode (first electrode 92). Heat is generated by the collision and the temperature of the end (projection 552p) of the anode (first electrode 92) rises.

FIG. 6B shows a second polarity state in which the first electrode 92 operates as a cathode and the second electrode 93 operates as an anode. In the second polarity state, electrons move from the first electrode 92 to the second electrode 93 inversely to the first polarity state. As a result, the temperature of the end (projection 562p) of the second electrode 93 rises.

As described above, the temperature of the anode with which the electrons collide tends to be higher than the temperature of the cathode emitting electrons. Here, the continuation of the condition that the temperature of one electrode is higher than that of the other electrode may cause various defects. For example, if the end of the electrode at the higher temperature excessively melts, unintended deformation of the electrode may be caused. As a result, the distance between electrodes (arc length) W1 may deviate from a proper value. Further, if the melt of the end of the electrode at the lower temperature is insufficient, minute irregularities produced on the end may be left unmelted. As a result, the so-called arc jump may occur (the arc position may unstably shift).

Figure 7A:
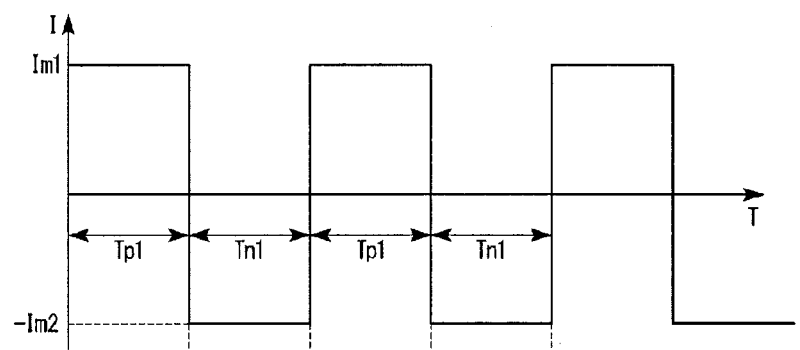
FIGS. 7A to 7C are graphs showing temperature changes of electrodes.
Figure 7B:
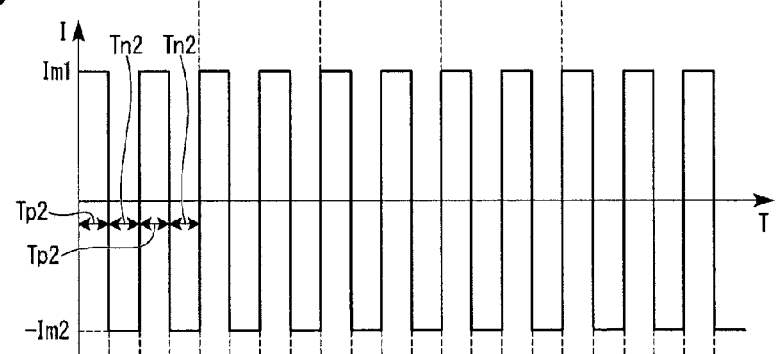

As a technology of suppressing the defects, use of alternating-current drive of repeatedly changing polarity of the respective electrodes has been considered. FIGS. 7A and 7B are timing charts showing examples of the drive current I supplied to the discharge lamp 90. The horizontal axis indicates time T and the vertical axis indicates current values of the drive current I. The drive current I shows the current flowing in the discharge lamp 90. The positive value shows the first polarity state and the negative value shows the second polarity state.

In the examples shown in FIGS. 7A and 7B, a rectangular wave alternating current is used as the drive current I. In the examples shown in FIGS. 7A and 7B, the first polarity state and the second polarity state are alternately repeated. Here, first polarity sections Tp1, Tp2 show times when the first polarity state continues and second polarity sections Tn1, Tn2 show times when the second polarity state continues. In the examples shown in FIGS. 7A and 7B, the average current value of the first polarity sections Tp1, Tp2 is Im1 and the average current value of the second polarity sections Tn1, Tn2 is −Im2. The frequency of the drive current I suitable for driving of the discharge lamp 90 may be experimentally determined according to the characteristics of the discharge lamp 90 (for example, a value in a range from 30 Hz to 1000 Hz is employed). The other values Im1, −Im2, Tp1, Tp2, Tn1, Tn2 may be similarly experimentally determined.

In the examples shown in FIGS. 7A and 7B, the frequency of the current shown in FIG. 7B is higher than the frequency of the current shown in FIG. 7A. That is, the first polarity section Tp2 is shorter than the first polarity section Tp1, and the second polarity section Tn2 is shorter than the second polarity section Tn1.

Figure 7C:
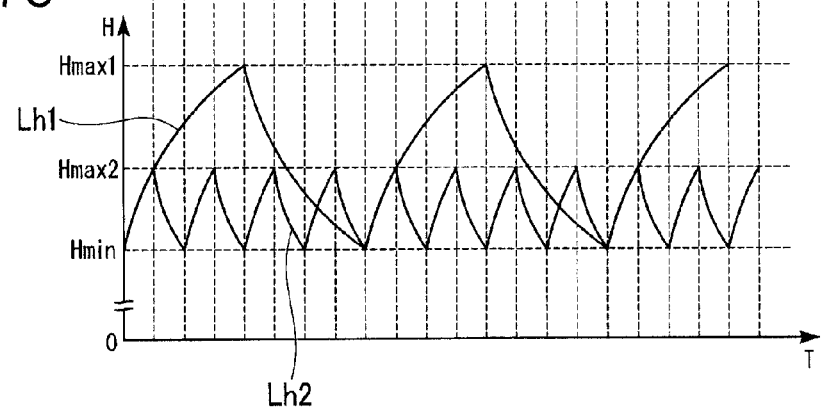

FIG. 7C is a timing chart showing temperature changes of the first electrode 92 when the currents shown in FIGS. 7A and 7B flow. The horizontal axis indicates time T and the vertical axis indicates temperature H. The waveform Lh1 is a waveform showing the temperature change of the first electrode 92 when the current shown in FIG. 7A flows. The waveform Lh2 is a waveform showing the temperature change of the first electrode 92 when the current shown in FIG. 7B flows.

As shown by the waveform Lh1 in FIG. 7C, when the current shown in FIG. 7A flows, the temperature H of the first electrode 92 rises in the first polarity section Tp1, and the temperature H of the first electrode 92 falls in the second polarity section Tn1. Further, similarly, as shown by the waveform Lh2 in FIG. 7C, when the current shown in FIG. 7B flows, the temperature H of the first electrode 92 rises in the first polarity section Tp2, and the temperature H of the first electrode 92 falls in the second polarity section Tn2.

The first polarity state and the second polarity state are repeated, and thereby, the temperatures H respectively shown on the waveform Lh1 and the waveform Lh2 periodically change between the minimum value Hmin and the maximum values Hmax1, Hmax2. Though not illustrated, the temperature of the second electrode 93 changes in opposite phase to the temperature H of the first electrode 92. That is, the temperature of the second electrode 93 falls in the first polarity state, and the temperature of the second electrode 93 rises in the second polarity state.

Here, the first polarity section Tp1 is longer than the first polarity section Tp2, and the time in which the temperature H of the first electrode 92 rises is longer in the first polarity section Tp1 than in the first polarity section Tp2. Thereby, the temperature H of the first electrode 92 rises to Hmax1 in the waveform Lh1, and the temperature H of the first electrode 92 rises to Hmax2 lower than Hmax1 in the waveform Lh2. Therefore, as the frequency of the alternating current flowing in the discharge lamp 90 is higher, the range of the temperature change of the first electrode 92 may be made narrower and the temperature rise of the first electrode 92 may be suppressed.

As below, a first embodiment of the drive current waveform will be explained.

Figure 8:
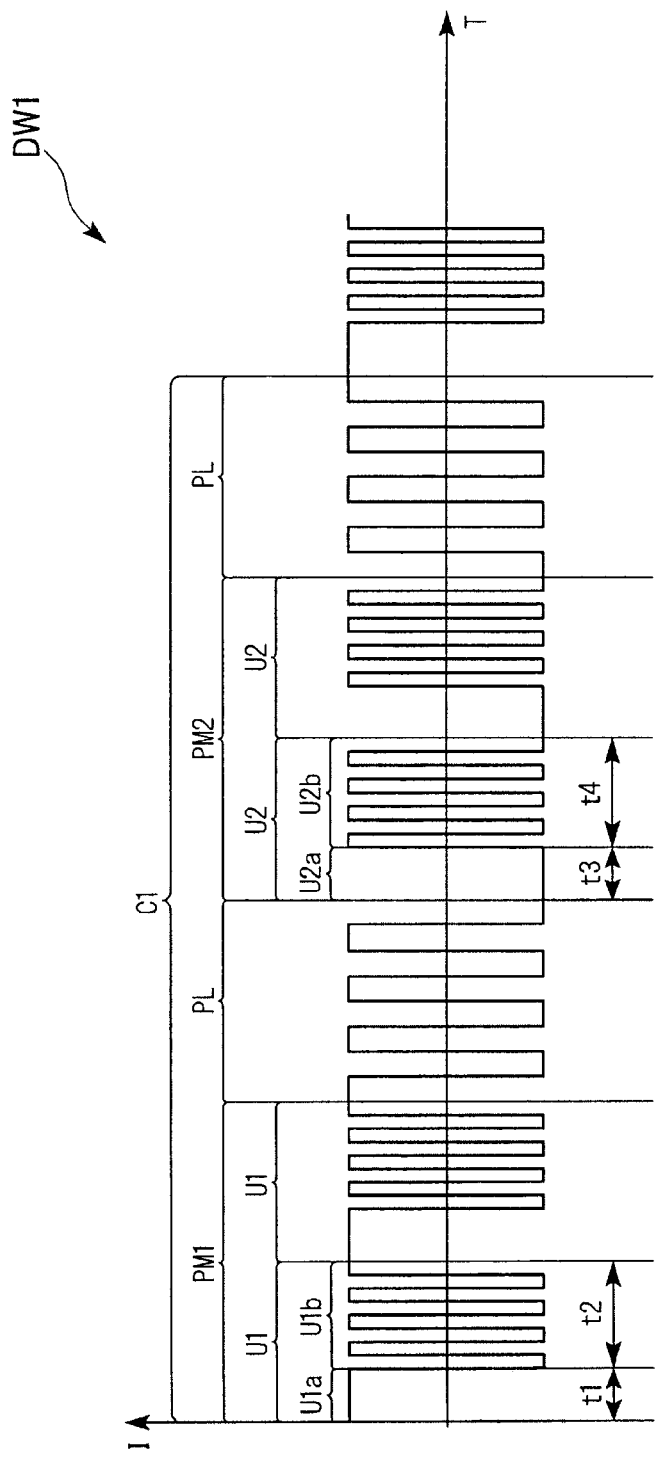
FIG. 8 shows a first embodiment of a drive current waveform of the discharge lamp.

FIG. 8 is a timing chart showing an example of drive current waveform DW1 of the embodiment. The control unit 40 controls the discharge lamp drive unit 230 according to the drive current waveform DW1. The horizontal axis indicates time T and the vertical axis indicates current I.

As shown in FIG. 8, in the drive current waveform DW1, a waveform pattern in a control cycle C1 is continuously formed.

The control cycle C1 has a first mixed frequency drive period PM1, low-frequency drive periods PL, and a second mixed frequency drive period PM2. The low-frequency drive periods PL are respectively provided immediately after the first mixed frequency drive period PM1 and immediately after the second mixed frequency drive period PM2. The control cycle C1 is repeated, and thereby, the first mixed frequency drive period PM1 and the second mixed frequency drive period PM2 are alternately repeated.

The first mixed frequency drive period PM1 includes first unit drive periods U1.

The first unit drive period U1 includes a first drive period U1a and a second drive period U1b.

The first mixed frequency drive period PM1 includes one to fifty first unit drive periods U1, for example. In FIG. 8, the first mixed frequency drive period PM1 includes two first unit drive periods U1.

The current waveform in the first drive period U1a is a half-period alternating-current waveform having positive current values. In other words, the first drive period U1a is a period in which an alternating current flows in the half period between the electrodes in the first polarity state. The alternating current flowing in the half period between the electrodes in the first polarity state equals to a direct current flowing between the electrodes in the first polarity state.

In the first drive period U1a, the frequency of the half-period alternating current supplied to the discharge lamp 90 is higher than 10 Hz and equal to or lower than 300 Hz, and, in terms of time in which the direct current is supplied, longer than 1/600 seconds and equal to or shorter than 1/20 seconds.

The current waveform in the second drive period U1b is a high-frequency alternating-current waveform. In other words, the second drive period U1b is a period in which a high-frequency alternating current is supplied to the discharge lamp 90.

The frequency of the alternating current supplied to the discharge lamp 90 in the second drive period U1 b is higher than 1000 Hz and equal to or lower than 10 GHz.

The length t2 of the second drive period U1b is set to be equal to or longer than the length t1 of the first drive period U1a.

The low-frequency drive period PL is a period in which a low-frequency alternating current higher than 10 Hz and equal to or lower than 1000 Hz is supplied to the discharge lamp 90. The low-frequency drive period PL is provided between the first mixed frequency drive period PM1 and the second mixed frequency drive period PM2. In the low-frequency drive period PL, the frequency of the current supplied to the discharge lamp 90 is normally the frequency used for driving the discharge lamp 90, and higher than 100 Hz and equal to or lower than 600 Hz, for example. The frequency of the alternating current in the low-frequency drive period PL may be experimentally determined according to the characteristics of the discharge lamp 90.

Note that, in the specification, the low frequency refers to the frequency equal to or lower than 1000 Hz.

The second mixed frequency drive period PM2 includes second unit drive periods U2.

The second unit drive period U2 includes a first drive period U2a and a second drive period U2b.

The second mixed frequency drive period PM2 includes one to fifty second unit drive periods U2, for example, like the first mixed frequency drive period PM1. In FIG. 8, the second mixed frequency drive period PM2 includes two second unit drive periods U2.

The first drive period U2a is different from the first drive period U1a in that a current flows between electrodes in the second polarity state. The second drive period U2b is the same as the second drive period U1b.

Further, like the first mixed frequency drive period PM1, the length t4 of the second drive period U2b is set to be equal to or longer than the length t3 of the first drive period U2a.

As below, changes of electrodes when a current flows between the electrodes will be explained according to the drive current waveform DW1.

First, in the first mixed frequency drive period PM1, a current flows between electrodes according to the current waveform in the first unit drive period U1. That is, in the first mixed frequency drive period PM1, the first drive period U1a and the second drive period U1b are alternately repeated in the number of first unit drive periods U1 forming the first mixed frequency drive period PM1.

In the first drive period U1a, an alternating current flows in the half period between the electrodes in the first polarity state. Thereby, as described above, the temperature of the first electrode 92 rises and the electrode constituent material of the first electrode 92 melts.

Then, in the second drive period U1b, a high-frequency alternating current flows between the electrodes, and thereby, the temperature of the first electrode falls. Accordingly, the melted electrode constituent material of the first electrode 92 aggregates and coagulates. Therefore, the first drive period U1a and the second drive period U1b are alternately repeated, and thereby, the first electrode 92, more specifically, the projection 552p grows.

Then, in the low-frequency drive period PL, a low-frequency alternating current flows between the electrodes. Thereby, the shape of the first electrode 92 grown in the first drive period U1a is arranged. It is considered that, though the details are unclear, this is because the low-frequency alternating current normally used as the current flowing in the discharge lamp flows, the temperature of the electrode becomes a proper temperature, and the electrode shape becomes a proper shape.

Then, in the second mixed frequency drive period PM2, the same reaction as that in the first mixed frequency drive period PM1 occurs in the second electrode 93. Thereby, the second electrode 93 grows.

Then, the low-frequency drive period PL is provided immediately afterward like the first mixed frequency drive period PM1, and the shape of the second electrode 93 is arranged.

In the above described manner, one control cycle C1 ends, and the control cycle C1 is repeated in the same manner.

According to the embodiment, in the first mixed frequency drive period PM1 and the second mixed frequency drive period PM2, the periods in which the current flows between the electrodes in each polarity state (the first drive period U1a and the first drive period U2a) and the periods in which the current flows between the electrodes in the polarity state alternately changed (the second drive period U1b and the second drive period U2b) are provided. Thereby, the reaction that the electrode melts and coagulates is repeated and the electrode grows. Accordingly, electrode wear may be suppressed and the distance between electrodes may be maintained. Further, in the second drive period U1b and the second drive period U2b, the high-frequency alternating current is supplied to the discharge lamp 90, and thereby, blackening and devitrification may be suppressed. Therefore, both electrode wear and blackening and devitrification may be suppressed and the life of the discharge lamp may be improved.

Further, according to the embodiment, the lengths of the second drive period U1b and the second drive period U2b are set to be equal to or longer than those of the first drive period U1a and the first drive period U2a. Accordingly, the suppression effect of electrode wear and blackening and devitrification is improved.

Furthermore, the first mixed frequency drive period PM1 and the second mixed frequency drive period PM2 are alternately repeated, and thereby, the growth of the first electrode 92 and the growth of the second electrode 93 are nearly equal and increase of the distance between electrodes due to deviation of electrode wear may be suppressed.

In addition, according to the embodiment, the low-frequency drive period PL is provided between the first mixed frequency drive period PM1 and the second mixed frequency drive period PM2, and thereby, the shape of the electrode may be arranged and the life of the discharge lamp may be improved.

Note that, in the embodiment, the following configurations may be employed.

It is not necessary to provide the low-frequency drive period PL depending on the type and the condition of the discharge lamp.

As below, a second embodiment of the drive current waveform will be explained.

Figure 9:
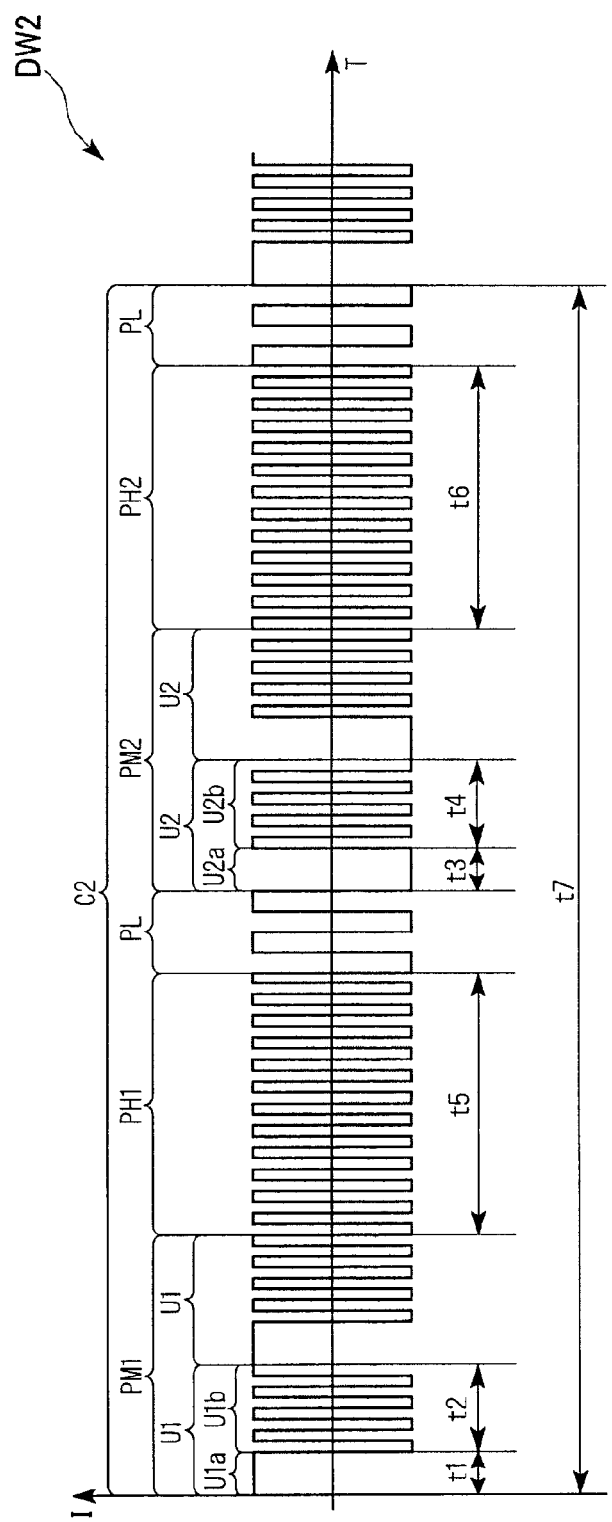
FIG. 9 shows a second embodiment of the drive current waveform of the discharge lamp.

FIG. 9 is a timing chart showing an example of drive current waveform DW2 of the embodiment.

As shown in FIG. 9, in the drive current waveform DW2, a waveform pattern in a control cycle C2 is continuously formed.

The control cycle C2 has a first mixed frequency drive period PM1, a first high-frequency drive period PH1, low-frequency drive periods PL, a second mixed frequency drive period PM2, and a second high-frequency drive period PH2. The low-frequency drive periods PL are respectively provided immediately after the first high-frequency drive period PH1 and immediately after the second high-frequency drive period PH2.

The first high-frequency drive period PH1 and the second high-frequency drive period PH2 are periods in which a high-frequency alternating current higher than 1000 Hz and equal to or smaller than 10 GHz flows between electrodes.

The total length of the length t5 of the first high-frequency drive period PH1 and the length t6 of the second high-frequency drive period PH2 is set to be equal to or longer than 50% of the length t7 of the control cycle C2. Within the range, the length t5 and the length t6 are not particularly limited, and the length t5 may be longer than the length t6 or vice versa or the length t5 and the length t6 may be equal.

The first high-frequency drive period PH1 is provided immediately after the first mixed frequency drive period PM1 and the second high-frequency drive period PH2 is provided immediately after the second mixed frequency drive period PM2.

The low-frequency drive periods PL are respectively provided between the first mixed frequency drive period PM1 and the second mixed frequency drive period PM2 like those in the first embodiment. In the embodiment, the low-frequency drive periods PL are provided immediately after the first high-frequency drive period PH1 and the second high-frequency drive period PH2.

According to the embodiment, even when slight blackening is produced due to the driving by the drive current waveform DW1 of the first embodiment, the produced blackening may be eliminated and the life of the discharge lamp may be further improved. As below, the detailed explanation will be made.

Normally, a halogen gas is enclosed within the discharge lamp. This is for halogenation of the electrode material by reaction of the melted and evaporated electrode material and the halogen gas. The melting point of the halogenated electrode material drops, and coagulation on the inner wall of the arc tube is suppressed, and blackening is suppressed as a result. Further, the halogenated electrode material is reduced and coagulates on the electrode. Thereby, the evaporated electrode material becomes a part of the material forming the electrode again, and electrode wear is suppressed. The reaction within the discharge lamp is called a halogen cycle.

The halogen cycle is harder to be generated in a condition that the temperature within the discharge lamp is unstable, but activated by stabilization of the temperature within the discharge lamp.

On the other hand, as described above, when a high-frequency current flows in the electrodes, the range of the temperature change of the electrode is narrower than that of a low-frequency current, and, as a result, the temperature within the discharge lamp may be stabilized (see FIG. 7C). Thereby, the halogen cycle is activated. When the halogen cycle is activated, halogenation of the electrode material also occurs on the inner wall of the arc tube. Accordingly, the electrode material that has attached to the inner wall of the arc tube may be returned to the part of the material forming the electrode again through the halogen cycle.

According to the embodiment, the lengths of the first high-frequency drive period PH1 and the second high-frequency drive period PH2 are set to be equal to or longer than 50% of the length of the control cycle C2, and thereby, the halogen cycle may be activated. Accordingly, for example, even when blackening is produced in the first mixed frequency drive period PM1 and the second mixed frequency drive period PM2, the electrode material that has attached to the inner wall of the arc tube may be returned to the electrode again in the first high-frequency drive period PH1 and the second high-frequency drive period PH2. Therefore, the produced blackening may be eliminated and electrode wear may be suppressed.

Further, the first high-frequency drive period PH1 is provided immediately after the first mixed frequency drive period PM1 and the second high-frequency drive period PH2 is provided immediately after the second mixed frequency drive period PM2. Accordingly, the temperature within the discharge lamp at the higher temperature in the first mixed frequency drive period PM1 and the second mixed frequency drive period PM2 may be lowered and the reaction of the rapidly growing electrode may be suppressed. Thereby, a preferable distance between electrodes may be kept and the life of the discharge lamp may be improved.

Note that, in the embodiment, the following configurations may be employed.

The first high-frequency drive period PH1 may not be necessarily provided immediately after the first mixed frequency drive period PM1 or the second high-frequency drive period PH2 may not be necessarily provided immediately after the second mixed frequency drive period PM2. In this case, for example, the low-frequency drive periods PL may be respectively provided immediately after the first mixed frequency drive period PM1 and the second mixed frequency drive period PM2, and the first high-frequency drive period PH1 and the second high-frequency drive period PH2 may be respectively provided after those.

The low-frequency drive periods PL are not necessarily provided.

As below, working examples of the first embodiment of the drive current waveform and the second embodiment of the drive current waveform will be respectively explained.

Long-term durability tests were conducted on the respective working examples of the first embodiment and the second embodiment, and comparisons were made with respect to electrode wear and blackening and devitrification of the discharge lamp to comparative examples. The long-term durability tests were conducted by flowing currents in the discharge lamp for 3000 hours.

As below, working example 1 as the working example of the first embodiment will be explained.

In the working example 1, the frequency of the current of the first drive period was set to 100 Hz, and the frequency of the current of the second drive period was set to 1200 Hz. The length of the first drive period was set to a half period of the frequency of 100 Hz, i.e., 5 ms. The length of the second drive period was set to ten periods of the frequency of 1200 Hz, i.e., 8.33 ms.

One mixed frequency drive period was set to three unit drive periods including the first drive periods and the second drive periods. Further, the frequency of the current in the low-frequency drive period was set to 280 Hz and the length of the low-frequency drive period was set to five periods of the alternating current, i.e., 17.86 ms.

Comparative example 1 is the case where the frequency of the current in the second drive period is set to 600 Hz compared to the working example 1. In other words, the comparative example 1 is the case where the frequency of the current in the second drive period is lower than 1000 Hz. The length of the second drive period was set to ten periods of the alternating current, i.e., 8.33 ms.

Comparative example 2 is the case where the alternating current at 1200 Hz flows for three periods, i.e., 2.5 ms in the second drive period compared to the working example 1. In other words, the comparative example 2 is the case where the second drive period is shorter than the first drive period.

Comparative example 3 is the case where the alternating current at 100 Hz flows for one period, i.e., 10 ms in the first drive period compared to the working example 1. In other words, the comparative example 3 is the case where the period in which the current flows only in one polarization state, i.e., the period in which a direct current flows is not provided.

The results of the long-term durability tests of the working example 1 and the comparative examples 1 to 3 are shown in Table 1.

Evaluations were respectively made in variation rate of the distance between electrodes, blackening and devitrification condition, illuminance maintenance rate. The distance between electrodes corresponds to the distance between electrodes W1 shown in FIGS. 6A and 6B.

TABLE 1

| | Variation rate of distance between electrodes | Condition of blackening and devitrification | Illuminance maintenance rate |
|---|---|---|---|
| Working example 1 | +15% | No blackening or devitrification | 70% |
| Comparative example 1 | +15% | Severe blackening and devitrification | 48% |
| Comparative example 2 | +15% | Severe blackening and devitrification | 52% |
| Comparative example 3 | +40% | No blackening and severe devitrification | 43% |

From Table 1, it is known that, although the distance between electrodes was kept, blackening and devitrification were produced and the illuminance maintenance rate was lower in the comparative example 1. It is considered that the suppression efficiency of blackening and devitrification was lower because the period of driving by the high-frequency current higher than 1000 Hz is not provided.

In the comparative example 2, like the comparative example 1, it is known that, although the distance between electrodes was kept, blackening and devitrification were produced and the illuminance maintenance rate was lower. It is considered that the sufficient suppression efficiency of blackening and devitrification was not obtained because the period of driving at the high frequency is shorter than the period of driving by the half-period alternating current.

In the comparative example 3, it is known that the distance between electrodes was larger, though no blackening occurred, devitrification was produced and the illuminance maintenance rate was lower. It is considered that the distance between electrodes was not controlled well because the period of driving by a direct current was not provided.

Compared to the comparative examples 1 to 3, in the working example 1, it is known that the variation rate of the distance between electrodes was suppressed to be lower and the illuminance maintenance rate was kept to be higher. Further, no blackening or devitrification of the discharge lamp was seen. Thereby, the life improvement effect of the discharge lamp of the working example 1 was confirmed.

As below, working example 2 as the working example of the second embodiment will be explained.

The working example 2 is different from the working example 1 only in that high-frequency drive periods are provided immediately after the mixed frequency drive periods. The high-frequency drive periods are respectively provided immediately after the first mixed frequency drive period and the second mixed frequency drive period, and the frequency of the current flowing in the high-frequency drive periods is 1200 Hz. The length of one high-frequency drive period is 72 periods of the high-frequency current, i.e., 60 ms. One control cycle includes two high-frequency drive periods. In other words, the total length of the high-frequency drive periods in one control cycle is 120 ms. The length of one control cycle in the working example 2 is 235.7 ms, and the total length of the high-frequency drive periods is set to be about 51% in one control cycle.

Comparative example 4 is the case where the ratio of the high-frequency drive periods in one control cycle is set to be smaller than 50% compared to the working example 2. The length of the high-frequency drive periods respectively provided immediately after the first mixed frequency drive period and the second mixed frequency drive period is 36 periods of the alternating current at 1200 Hz, i.e., 30 ms. Thereby, the ratio of the high-frequency drive periods in one control cycle is set to be about 34%.

Comparative example 5 is the case where the frequency of the current flowing in the electrodes in the high-frequency drive periods is set to be lower than 1000 Hz compared to the working example 2. The frequency of the alternating current in the high-frequency drive periods is set to 500 Hz, and the length of the high-frequency drive period is set to be the same as that of the working example 2.

The results of the long-term durability tests of the working example 2 and the comparative examples 4 and 5 are shown in Table 2.

Evaluations were respectively made in variation rate of the distance between electrodes, blackening and devitrification condition, illuminance maintenance rate like those for the working example 1.

TABLE 2

| | Variation rate of distance between electrodes | Condition of blackening and devitrification | Illuminance maintenance rate |
|---|---|---|---|
| Working example 2 | +15% | No blackening or devitrification | 70% |
| Comparative example 4 | +15% | Severe blackening and devitrification | 54% |
| Comparative example 5 | +30% | Severe blackening and devitrification | 58% |

From Table 2, it is known that, although the distance between electrodes was kept, blackening and devitrification were produced and the illuminance maintenance rate was lower in the comparative example 4. It is considered that blackening was not sufficiently eliminated because the length of the high-frequency drive periods is too short.

In the comparative example 5, like the comparative example 4, it is known that, although the distance between electrodes was kept, blackening and devitrification were produced and the illuminance maintenance rate was lower. It is considered that the suppression and elimination efficiency of blackening was not sufficiently obtained because the frequency of the current in the high-frequency drive periods is low.

Compared to the comparative examples 4 and 5, in the working example 2, it is known that the variation rate of the distance between electrodes was suppressed to be lower and the illuminance maintenance rate was kept to be higher. Further, no blackening or devitrification of the discharge lamp was seen. Thereby, the life improvement effect of the discharge lamp of the working example 2 was confirmed.

Further, in comparison between the working example 1 and the working example 2 with reference to the tables 1 and 2, it is known that the illuminance maintenance rate was higher in the working example 2 than in the working example 1. Thereby, the suppression and elimination effect of blackening by providing the high-frequency drive periods was confirmed.

The entire disclosure of Japanese Patent Application No. 2013-112628, filed May 29, 2013 is expressly incorporated by reference herein.

What is claimed is:

1. A discharge lamp driver comprising:
   a discharge lamp drive unit that supplies a drive current for driving a discharge lamp to the discharge lamp; and
   a control unit that controls the discharge lamp drive unit according to a drive current waveform,
   wherein the drive current waveform has a mixed frequency drive period including a unit drive period containing a first drive period in which a first drive current is supplied to the discharge lamp and a second drive period provided immediately after the first drive period, in which a second drive current is supplied to the discharge lamp,
   the first drive current is a half-period alternating current having a frequency higher than 10 Hz and not higher than 300Hz,
   the second drive current is an alternating current having a frequency higher than 1000 Hz,
   a length of the second drive period is equal to or longer than a length of the first drive period,
   the unit drive period contains the first unit drive period in which the first drive current has one polarity and the second unit drive period in which the first drive current has the other polarity, and
   the mixed frequency drive period contains a first mixed frequency drive period including the first unit drive period and a second mixed frequency drive period including the second unit drive period.

2. The discharge lamp driver according to claim 1, wherein
   the first mixed frequency drive period and the second mixed frequency drive period are alternately provided.

3. The discharge lamp driver according to claim 2, wherein a high-frequency drive period in which a high-frequency alternating current having a frequency higher than 1000 Hz is supplied to the discharge lamp drive unit is provided between the first and the second mixed frequency drive periods.

4. The discharge lamp driver according to claim 3, wherein the high-frequency drive period contains a first high-frequency drive period provided after the first mixed frequency drive period, and a second high-frequency drive period provided after the second mixed frequency drive period, and
   a total period length of the first high frequency drive period and the second high frequency drive period is equal to or longer than 50% of a length of a period from a start of the first mixed frequency drive period to a start of next first mixed frequency drive period.

5. The discharge lamp driver according to claim 3, wherein the high-frequency drive period is provided immediately after the mixed frequency drive period.

6. The discharge lamp driver according to claim 1, wherein the mixed frequency drive period includes one to fifty of the unit drive periods.

7. The discharge lamp driver according to claim 1, wherein a low-frequency drive period in which a low-frequency alternating current having a frequency higher than 10 Hz and equal to or lower than 1000 Hz is supplied is provided after the mixed frequency drive period.

8. The discharge lamp driver according to claim 7, wherein the frequency of the low-frequency alternating current is higher than 100 Hz and equal to or lower than 600 Hz.

9. A light source comprising:
   a discharge lamp that outputs light; and
   the discharge lamp driver according to claim 1.

10. A light source comprising:
    a discharge lamp that outputs light; and
    the discharge lamp driver according to claim 2.

11. A light source comprising:
    a discharge lamp that outputs light; and
    the discharge lamp driver according to claim 3.

12. A light source comprising:
    a discharge lamp that outputs light; and
    the discharge lamp driver according to claim 4.

13. A light source comprising:
    a discharge lamp that outputs light; and
    the discharge lamp driver according to claim 5.

14. A projector comprising:
    the light source according to claim 9;
    a light modulator that modulates the light output from the light source in response to a video signal; and
    a projection system that projects the light modulated by the light modulator on a projected surface.

15. A projector comprising:
    the light source according to claim 10;
    a light modulator that modulates the light output from the light source in response to a video signal; and
    a projection system that projects the light modulated by the light modulator on a projected surface.

16. A projector comprising:
    the light source according to claim 11;
    a light modulator that modulates the light output from the light source in response to a video signal; and
    a projection system that projects the light modulated by the light modulator on a projected surface.

17. A projector comprising:
    the light source according to claim 12;
    a light modulator that modulates the light output from the light source in response to a video signal; and
    a projection system that projects the light modulated by the light modulator on a projected surface.

18. A projector comprising:
    the light source according to claim 13;
    a light modulator that modulates the light output from the light source in response to a video signal; and
    a projection system that projects the light modulated by the light modulator on a projected surface.

19. A method of driving a discharge lamp comprising:
    supplying a half-period alternating current having a frequency higher than 10 Hz and equal to or lower than 300 Hz to the discharge lamp in a first drive period, and
    supplying an alternating current having a frequency higher than 1000 Hz to the discharge lamp in a second drive period provided immediately after the first drive period,
    wherein a length of the second drive period is equal to or longer than a length of the first drive period,
    the first drive period being a period in which the half-period alternating current has one polarity and the second drive period being a drive period in which the half-period alternating current has the other polarity, and
    a mixed frequency drive period contains a first mixed frequency drive period including the first unit drive period and a second mixed frequency drive period including the second unit drive period.

* * * * *